(12) United States Patent
Stracey et al.

(10) Patent No.: US 12,723,999 B2
(45) Date of Patent: Sep. 1, 2026

(54) APPARATUS AND METHOD FOR MEASURING CHLORINE CONTENT OF A SOLUTION

(71) Applicant: PROCESS INSTRUMENTS (UK) LTD, Lancashire (GB)

(72) Inventors: Craig Stracey, Lancashire (GB); Mike Riding, Lancashire (GB)

(73) Assignee: PROCESS INSTRUMENTS (UK) LTD, Lancashire (GB)

( * ) Notice: Subject to any disclaimer, the term of this patent is extended or adjusted under 35 U.S.C. 154(b) by 146 days.

(21) Appl. No.: 18/566,752

(22) PCT Filed: Jun. 13, 2022

(86) PCT No.: PCT/GB2022/051476
§ 371 (c)(1),
(2) Date: Dec. 4, 2023

(87) PCT Pub. No.: WO2022/263795
PCT Pub. Date: Dec. 22, 2022

(65) Prior Publication Data
US 2024/0272110 A1 Aug. 15, 2024

(30) Foreign Application Priority Data
Jun. 14, 2021 (GB) ..................................... 2108443

(51) Int. Cl.
*G01N 27/27* (2006.01)
*G01N 21/25* (2006.01)

(52) U.S. Cl.
CPC .......... *G01N 27/27* (2013.01); *G01N 21/251* (2013.01)

(58) Field of Classification Search
CPC .. G01N 27/27; G01N 27/4045; G01N 21/251; G01N 21/25; G01N 31/22; G01N 31/182
See application file for complete search history.

(56) References Cited

U.S. PATENT DOCUMENTS

2010/0320095 A1* 12/2010 Galperin .............. G01N 33/182 204/431
2012/0145561 A1* 6/2012 Coulon .............. G01N 33/1886 205/778.5
(Continued)

FOREIGN PATENT DOCUMENTS

FR 2778463 A1 11/1999
WO WO 97/42497 A1 11/1997

OTHER PUBLICATIONS

Omega, FCLTX-100 series, https://assets.omega.com/manuals/M4679.pdf, Nov. 29, 2020 (Year: 2020).*
(Continued)

*Primary Examiner* — Shizhi Qian
(74) *Attorney, Agent, or Firm* — Cozen O'Connor

(57) ABSTRACT

An apparatus measures chlorine content of a solution. The apparatus comprises a colorimeter configured to measure the chlorine content and output a first signal; an electrochemical sensor configured to measure the chlorine content and output a second signal; and a processing system configured to receive the first signal and the second signal and output a measurement of the chlorine content using at least one of the first signal and the second signal.

13 Claims, 2 Drawing Sheets

(56) References Cited

U.S. PATENT DOCUMENTS

| | | | | |
|---|---|---|---|---|
| 2016/0131578 | A1* | 5/2016 | Rachman | G01N 21/51<br>356/339 |
| 2018/0143152 | A1* | 5/2018 | Silveri | G01N 27/06 |
| 2020/0340968 | A1* | 10/2020 | Zakinov | G01F 15/06 |

OTHER PUBLICATIONS

Beeharry et al., Profiling chlorine residuals using DPD and amperometric field test kits in a chlorinated small drinking water system with ammonia present in source water, HER, 2018, 61, 39-49 (Year: 2018).*

PCT/GB2022/051476 International Search Report and Written Opinion dated Jul. 15, 2022, 14 pages.

GB Patent Application No. 2108443.9, Combined Search and Examination Report dated Mar. 3, 2022, 3 pages.

Wilson, R.E. et al: "Continuous Chlorine Detection in Drinking Water and a Review of New Detection Methods", Johnson Matthey Technology Review, vol. 63, No. 2, Apr. 1, 2019, pp. 103-118.

* cited by examiner

APPARATUS AND METHOD FOR MEASURING CHLORINE CONTENT OF A SOLUTION

FIELD

The present invention relates generally to a measurement apparatus, and more particularly to an apparatus for measuring chlorine content of a solution and a method thereof.

BACKGROUND TO THE INVENTION

Measurement of chlorine content is important because of the ubiquity of the use of chlorine in the sanitization of water. There are currently two principal methods for measuring chlorine content of a solution. The first of these methods employs a colorimeter, the second of these methods employs an electrochemical sensor.

Colorimetry is advantageous because regular calibration of the colorimeter is unnecessary. As colorimetry uses the international standard for measuring chlorine, which is to add an indicator and measure the colour change, it is effectively an automated and repeated one-off test. Further, a colorimeter can be used almost immediately such that there is minimal (e.g., minutes) time delay between powering on the colorimeter and optimally using the colorimeter for measuring chlorine content (i.e., there is no/minimal warm-up time). However, in terms of disadvantages, colorimetry requires use a reagent, and each reading takes approximately 2 minutes. Use of a reagent is both costly and time-consuming, because reagents need to be procured, transported and changed regularly.

Advantages of electrochemical sensing include the lack of a reagent and the very short time required for each reading. Disadvantageously, electrochemical sensors require calibration, which is typically performed manually by a user, and have a long warm-up time (e.g., 24 hours after the powering on).

Hence, there is a need for an apparatus for measuring chlorine content of a solution and a method thereof that eliminate or reduce each of use of a reagent, performance of calibration and existence of a warm-up time. Such an improved apparatus and method would enable, among other things, cheaper and quicker measurement of chlorine content of a solution.

SUMMARY OF THE INVENTION

According to a first aspect, there is provided an apparatus for measuring chlorine content of a solution. The apparatus comprises a colorimeter configured to measure the chlorine content and output a first signal; an electrochemical sensor configured to measure the chlorine content and output a second signal; and a processing system configured to receive the first signal and the second signal and output a measurement of the chlorine content using at least one of the first signal and the second signal.

The processing system may be configured to output a measurement using the first signal and the second signal.

The processing system may be configured to calibrate the second signal using the first signal.

The processing system may be configured to track a difference between the first signal and the second signal.

The processing system may be configured to indicate when the difference exceeds a predetermined alert threshold.

The colorimeter may be configured to output the first signal less frequently than the electrochemical sensor is configured to output the second signal.

The colorimeter may be a DPD (diethyl-p-phenylene diamine) colorimeter or a TMB (3,3',5,5'-Tetramethylbenzidine) colorimeter.

The electrochemical sensor maybe an amperometric sensor.

The chlorine content may be free chlorine content and/or total chlorine content.

The apparatus may comprise a housing enclosing the colorimeter and the electrochemical sensor and, optionally, the processing system.

According to a second aspect, there is provided a method of measuring chlorine content of a solution using the apparatus of the first aspect.

According to a third aspect, there is provided a method of measuring chlorine content of a solution. The method comprises measuring, by a colorimeter, the chlorine content and outputting a first signal; measuring, by an electrochemical sensor, the chlorine content and outputting a second signal; and receiving, by a processing system, the first signal and the second signal and outputting a measurement of the chlorine content using at least one of the first signal and the second signal.

According to a fourth aspect, there is provided a computer program comprising instructions for implementing the method of the second or third aspect.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION

Figure 1:
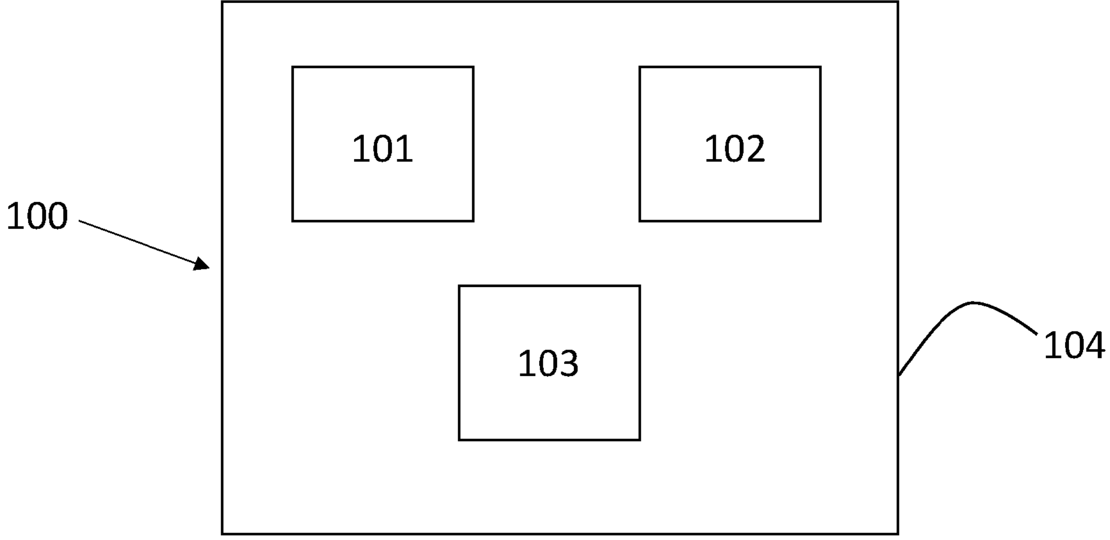
FIG. 1 schematically depicts an apparatus for measuring chlorine content of a solution according to an exemplary embodiment.

FIG. 1 schematically depicts an apparatus 100 for measuring chlorine content of a solution according to an exemplary embodiment. The solution could be a mixture of any fluids, but typically the solution is an aqueous solution. The chlorine content may be free chlorine content and/or total chlorine content, wherein total chlorine content is the sum of the free chlorine content and the combined chlorine content. Free chlorine is the chlorine that has not interacted with any contaminants in the solution, whereas combined chlorine is the chlorine that has reacted with the contaminants in the solution. It is important to know the amount of free chlorine, because it is free chlorine that is predominantly responsible for sanitizing the solution. It is important to know the amount of combined chlorine, because combined chlorine can be harmful and produces an unpleasant odour above a certain concentration.

The apparatus 100 shown in FIG. 1 comprises a colorimeter 101, an electrochemical sensor 102 and a processing system 103. In FIG. 1, the components 101, 102, 103 of the apparatus 100 are shown as being part of a single device in a housing 104, which may be protective and/or effect a compact apparatus 100. However, in another example, the components 101, 102, 103 may be spatially remote but in communication with each other, for example, by wired or wireless electronic communication. To this end, each of the components 101, 102, 103 may each comprise a transmitter or a receiver or both (not shown). In some environments, for example large spaces, spatially remote components 101, 102, 103 are advantageous, because readings can be made in locations which are far apart.

The colorimeter 101 is configured to measure the chlorine content and output a first signal. The colorimeter 101 may be a DPD (diethyl-p-phenylene diamine) colorimeter or a TMB (3,3',5,5'-Tetramethylbenzidine) colorimeter. The electrochemical sensor 102 is configured to measure the chlorine content and output a second signal. The electrochemical 102 sensor may be an amperometric sensor.

The processing system 103 is configured to receive the first signal and the second signal and output a measurement of the chlorine content using at least one of the first signal and the second signal. Using at least one of the first signal or the second signal means that it is possible to use whichever of the first signal and second signal is most useful at a given time. For instance, only the first signal from the colorimeter 101 may be used for an initial time period until the electrochemical sensor 102 has had sufficient time to warm-up.

The combination of features is subtly powerful. The specific combination of a colorimeter 101 and an electrochemical sensor 102 allows for the sensors/detectors to be used in a synergistic way, taking advantage of the benefits of both and negating the weaknesses of both. Other combinations of other sensors could not work in this synergistic manner. For those other sensors, the relative strengths and weaknesses are not complementary, or not as complementary as the combination of the present invention.

The measurement may be output to another component of the apparatus 100, or be output external to the apparatus 100. For example, additional processing of the measurement maybe undertaken within, or external to, the apparatus 100. The measurement may be output to a display or a memory (not shown). For example, the measurement may be output to a display apparatus monitored by a user, and this display could be part of, or separate to, the apparatus 100. The measurement may be quantitative or qualitative. For example, the measurement might reveal a percentage (e.g. X %) or absolute value (e.g. Y ppm) of the concentration, or might indicate something more descriptive (e.g. “low”, “normal”, “too high”).

In one example, the processing system 103 is configured to output the measurement using the first signal and the second signal. For instance, the processing system 103 may output the measurement computed as a mean of the first signal and the second signal, which may provide a more accurate measurement. Using the first signal and the second signal may mean calibrating the second signal using the first signal. Using the first signal to calibrate the second signal negates the need to calibrate the electrochemical sensor 102.

In one example, the processing system 103 is configured to track a difference between the first signal and the second signal. Typically, the processing system 103 tracks a difference between an amplitude of the first signal and the second signal. For example, at regular time intervals the processing system 103 may compute the difference between the first signal and the second signal. When this difference exceeds a predetermined alert threshold, the processing system 103 may be configured to indicate to the user that this alert threshold has been exceeded. For example, the apparatus 100 may comprise an audio and/or visual alarm that is activated by the processing system 103 when the alert threshold is reached. Similarly, the processing system 103 may be configured to send an alert signal to an external alarm when the alert threshold is reached. Indicating to the user when the alert threshold is reached prompts the user to check the apparatus 100 has been set up correctly, as reaching the alert threshold is likely indicative of an error in the functioning of either the colorimeter 101 or the electrochemical sensor 102. In some cases, the processing apparatus 103 may be configured to only output the measurement if the difference is less than the alert threshold (e.g., when the difference is null).

In one example, the colorimeter 101 is configured to output the first signal less frequently than the electrochemical sensor 102 is configured to output the second signal. For example, the first signal may be output every 10 units of time (e.g., seconds, hours, days), whereas the second signal may be output every 1 unit of time. Each first signal may be simultaneous with a second signal or the signals may never coincide. Simultaneous signals may enable a good degree of correlation. In contrast, signals which do not coincide may enable filtering of possible errors with simultaneous measurements or outputs.

The apparatus 100 may comprise a memory (not shown) to store, for example, a first signal output by the colorimeter 101, the memory subsequently being accessed by the processing system 103 when the second signal is received by the processing unit 103 in order to output the measurement using both signals as described above. Outputting the first signal less frequently than the second signal has the benefit of reducing the use of reagent by the colorimeter 101, the electrochemical sensor 102 not requiring a reagent. Reducing use of reagent may mean that less reagent needs to be installed in the apparatus 100 and/or that reagent needs to be restocked less frequently. These are significant benefits of the invention in general, with related impacts on cost, safety, and maintenance.

Figure 2:
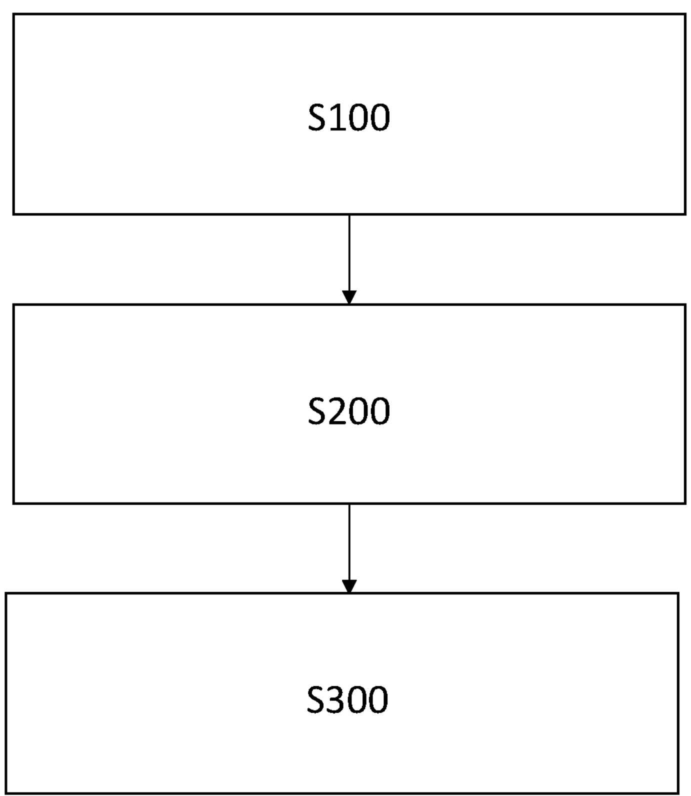
FIG. 2 schematically depicts a method of measuring chlorine content of a solution according to an exemplary embodiment.

FIG. 2 schematically depicts a method measuring chlorine content of a solution according to an exemplary embodiment. The method comprises measuring S100, by a colorimeter 101, the chlorine content and outputting a first signal; measuring S200, by an electrochemical sensor 102, the chlorine content and outputting a second signal; and receiving S300, by a processing system 103, the first signal and the second signal and outputting a measurement of the chlorine content using at least one of the first signal and the second signal.

The colorimeter 101, electrochemical sensor 102 and processing system 103 are as described above in relation to FIG. 1. Resultingly, the method shown in FIG. 2 may also comprise calibrating the second signal using the first signal. The method may further comprise tracking a difference between the first signal and the second signal. The method may further comprise indicating when the difference exceeds a predetermined alert threshold. The method may further comprise outputting the first signal less frequently than the second signal.

Although a preferred embodiment has been shown and described, it will be appreciated by those skilled in the art that various changes and modifications might be made without departing from the scope of the invention, as defined in the appended claims and as described above.

In summary, the invention provides an apparatus 100 for measuring chlorine content of a solution and a method thereof that mitigate the disadvantage of the warm-up time associated with an electrochemical sensor 102, eliminate the requirement of calibration associated with an electrochemical sensor 102 and reduce the amount of reagent used.

Consequently, the invention provides improved time and cost efficiency and a more resilient measurement of chlorine content of a solution compared with conventional methods.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. An apparatus for measuring chlorine content of a solution, the apparatus comprising:

a colorimeter configured to measure the chlorine content and output a first signal;

an electrochemical sensor configured to measure the chlorine content and output a second signal; and a processing system configured to receive the first signal and the second signal and output a measurement of the chlorine content using at least one of the first signal and the second signal; and a housing enclosing both the colorimeter and the electrochemical sensor;

wherein the processing system is configured to output one measurement value using the first signal and the second signal, wherein the processing system is configured to calibrate the second signal using the first signal.

2. The apparatus of claim 1, wherein the processing system is configured to track a difference between the first signal and the second signal.

3. The apparatus of claim 2, wherein the processing system is configured to indicate when the difference exceeds a predetermined alert threshold.

4. The apparatus of claim 1, wherein the colorimeter is configured to output the first signal less frequently than the electrochemical sensor is configured to output the second signal.

5. The apparatus of claim 1, wherein the colorimeter is a diethyl-p-phenylene diamine (DPD) colorimeter or a Tetramethylbenzidine (TMB) colorimeter.

6. The apparatus of claim 1, wherein the electrochemical sensor is an amperometric sensor.

7. The apparatus of claim 1, wherein the chlorine content is free chlorine content and/or total chlorine content.

8. The apparatus of claim 1, the housing further enclosing the processing system.

9. The apparatus of claim 1, wherein output the one measurement value using the first signal and the second signal includes determining a mean measurement of the first signal and the second signal.

10. An apparatus for measuring chlorine content of a solution, the apparatus comprising:

a colorimeter configured to measure the chlorine content and output a first signal;

an electrochemical sensor configured to measure the chlorine content and output a second signal; and a processing system configured to receive the first signal and the second signal and output a measurement of the chlorine content using at least one of the first signal and the second signal; and a housing enclosing both the colorimeter and the electrochemical sensor;

wherein the processing system is configured to output one measurement value using the first signal and the second signal, wherein the processing system is configured to calibrate the second signal using the first signal;

wherein the first signal and the second signal are measured simultaneously.

11. An apparatus for measuring chlorine content of a solution, the apparatus comprising:

a colorimeter configured to measure the chlorine content and output a first signal;

an electrochemical sensor configured to measure the chlorine content and output a second signal; and a processing system configured to receive the first signal and the second signal and output a measurement of the chlorine content using at least one of the first signal and the second signal; and a housing enclosing both the colorimeter and the electrochemical sensor;

wherein the processing system is configured to output one measurement value using the first signal and the second signal, wherein the processing system is configured to calibrate the second signal using the first signal;

wherein the first signal and the second signal are measured at non-coinciding times.

12. An apparatus for measuring chlorine content of a solution, the apparatus comprising:

a colorimeter configured to measure the chlorine content and output a first signal;

an electrochemical sensor configured to measure the chlorine content and output a second signal; and a processing system configured to receive the first signal and the second signal and output a measurement of the chlorine content using at least one of the first signal and the second signal; and a housing enclosing both the colorimeter and the electrochemical sensor;

wherein the processing system is configured to output one measurement value using the first signal and the second signal, wherein the processing system is configured to calibrate the second signal using the first signal;

wherein the first signal is measured less frequently than the second signal.

13. A method of measuring chlorine content of a solution, the method comprising:

measuring, by a colorimeter, the chlorine content and outputting a first signal;

measuring, by an electrochemical sensor, the chlorine content and outputting a second signal; and receiving, by a processing system, the first signal and the second signal and outputting one measurement value of the chlorine content using the first signal and the second signal; and calibrating the second signal using the first signal;

wherein both the colorimeter and the electrochemical sensor are enclosed in a housing.

* * * * *